(12) United States Patent
Adibi (10) Patent No.: US 9,053,420 B2
(45) Date of Patent: Jun. 9, 2015

(54) METHODS AND SYSTEMS FOR SCALABLE GROUP DETECTION FROM MULTIPLE DATA STREAMS

(71) Applicant: REUNIFY LLC, Los Angeles, CA (US)

(72) Inventor: Jafar Adibi, Los Angeles, CA (US)

(73) Assignee: REUNIFY LLC, Santa Monica, CA (US)

( * ) Notice: Subject to any disclaimer, the term of this patent is extended or adjusted under 35 U.S.C. 154(b) by 273 days.

(21) Appl. No.: 13/842,773

(22) Filed: Mar. 15, 2013

(65) Prior Publication Data

US 2014/0089237 A1 Mar. 27, 2014

Related U.S. Application Data

(60) Provisional application No. 61/705,364, filed on Sep. 25, 2012.

(51) Int. Cl.
  *G06F 17/00* (2006.01)
  *G06N 5/02* (2006.01)
  *G06N 99/00* (2010.01)

(52) U.S. Cl.
  CPC ............... *G06N 5/02* (2013.01); *G06N 99/005* (2013.01)

(58) Field of Classification Search
  USPC .......................................................... 706/12
  See application file for complete search history.

(56) References Cited

U.S. PATENT DOCUMENTS

| 2006/0242130 A1* | 10/2006 | Sadri et al. ................... 707/3 |
| 2008/0040324 A1* | 2/2008 | Sadri et al. ................... 707/3 |
| 2014/0089237 A1* | 3/2014 | Adibi ........................... 706/12 |
| 2014/0089240 A1* | 3/2014 | Adibi ........................... 706/13 |
| 2014/0089334 A1* | 3/2014 | Adibi et al. ................. 707/758 |

OTHER PUBLICATIONS

Mining hidden communities in social networks using KD-Tree and improved KD-Tree, Devi, R.R. ; Hemalatha, M. Computing, Communications and Networking Technologies (ICCCNT),2013 Fourth International Conference on DOI: 10.1109/ICCCNT.2013.6726478 Publication Year: 2013 , pp. 1-7.*

Strong Compound-Risk Factors: Efficient Discovery Through Emerging Patterns and Contrast Sets, Jinyan Li ; Qiang Yang Information Technology in Biomedicine, IEEE Transactions on vol. 11 , Issue: 5 DOI: 10.1109/TITB.2007.891163 Publication Year: 2007 , pp. 544-552.*

(Continued)

*Primary Examiner* — Michael B Holmes
(74) *Attorney, Agent, or Firm* — Carlos R. Villamar; The Villamar Firm PLLC (57) ABSTRACT

A system, method and computer program product for identifying strong links and discovering hidden relationships among entities, including identifying strong links and discovering hidden relationships among entities, wherein the entities include places, time slots, people, groups, and organizations; and identifying the strong links and discovering the hidden relationships based on low-level data streams, and incomplete and noisy evidence data streams.

12 Claims, 12 Drawing Sheets

(56) References Cited

OTHER PUBLICATIONS

Discovering Emerging Topics in Social Streams via Link-Anomaly Detection, Takahashi, T. ; Tomioka, R. ; Yamanishi, K. Knowledge and Data Engineering, IEEE Transactions on vol. 26 , Issue: 1 DOI: 10.1109/TKDE.2012.239 Publication Year: 2014 , pp. 120-130.*

Discovering Feedback and Coupled Feedback Loops in KEGG Pathways through Cross-Map Identification, Chen-Lung Liu ; Chien-Ming Chen ; Hui-Huang Hsu ; Tun-Wen Pai Complex, Intelligent, and Software Intensive Systems (CISIS), 2013 Seventh International Conference on DOI: 10.1109/CISIS.2013.102 Publication Year: 2013 , pp. 565-569.*

* cited by examiner

| Time | Action | P1 | P2 | P3 | P4 |
|---|---|---|---|---|---|
| 1 | P1 Email P2 | E | E | Φ | Φ |
| 2 | P3 Call P4 | Φ | Φ | C | C |
| 3 | P2 Social Gathering P3 | Φ | M | M | Φ |
| 4 | P1 Email P2 | E | E | Φ | Φ |
| 5 | P2 Email P3 | Φ | E | E | Φ |
| 6 | P1 Call P3 | C | Φ | C | Φ |
| 7 | P1 Call P2 | C | P | Φ | Φ |
| 8 | P2 Social Gathering P3 | Φ | M | M | Φ |
| 9 | P3 Social Gathering P4 | Φ | Φ | M | M |
| 10 | P1 Social Gathering P3 | M | Φ | M | Φ |
| 11 | P2 Call P3 | Φ | C | C | Φ |

METHODS AND SYSTEMS FOR SCALABLE GROUP DETECTION FROM MULTIPLE DATA STREAMS

CROSS REFERENCE TO RELATED DOCUMENTS

The present invention claims priority to U.S. Provisional Patent Application Ser. No. 61/705,364 of ADIBI, entitled "METHODS AND SYSTEMS FOR SCALABLE GROUP DETECTION FROM MULTIPLE DATA STREAMS," filed on Sep. 25, 2012, the entire disclosure of which is hereby incorporated by reference herein.

BACKGROUND OF THE INVENTION

1. Field of the Invention

The present invention relates generally to data analysis systems and methods, and more particularly to system and methods for scalable group detection from multiple data streams, and the like.

2. Discussion of the Background

In recent years, data analysis systems and methods have been developed and continually refined. However, such data analysis systems and methods have been hindered by various limitations, for example, including limitations related providing scalable group detection from multiple data streams, and the like.

SUMMARY OF THE INVENTION

Therefore, there is a need for methods and systems that address the above and other problems with data analysis systems and methods. Accordingly, the above and other needs are addressed by the illustrative embodiments of the present invention, which provide a novel method and system for scalable group detection from multiple data streams, and the like.

Accordingly, in an illustrative aspect, there is provided a system, method and computer program product for product for identifying strong links and discovering hidden relationships among entities, including identifying strong links and discovering hidden relationships among entities, wherein the entities include places, time slots, people, groups, and organizations; and identifying the strong links and discovering the hidden relationships based on low-level data streams, and incomplete and noisy evidence data streams.

The system, method and computer program product configured to combine knowledge representation and reasoning with approximation and randomization, text mining, machine learning, link discovery and statistical analysis to find a connection among seemingly unrelated entities from data streams.

The system, method and computer program product configured to identify groups based on knowing a small number of group members by approximation and sampling based on algorithms including Hoeffding bound to reduce a potential error between sampled and non-sampled data to determine if an error is acceptable or not.

The system, method and computer program product configured to expand a hybrid link discovery model from a static database to a multi-stream database.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which.

DETAILED DESCRIPTION OF THE PREFERRED EMBODIMENTS

To address the above and other problems with data analysis systems and methods, provided is new and useful systems and methods for identifying strong links and discovering hidden relationships among entities, such as places, time slots, people, groups, organizations, and the like, based on low-level, incomplete and noisy evidence data, through developing a hybrid link discovery system that combines state-of-the-art knowledge representation and reasoning with approximation and randomization, text mining, machine learning link discovery, statistical analysis, and the like.

Figure 1:
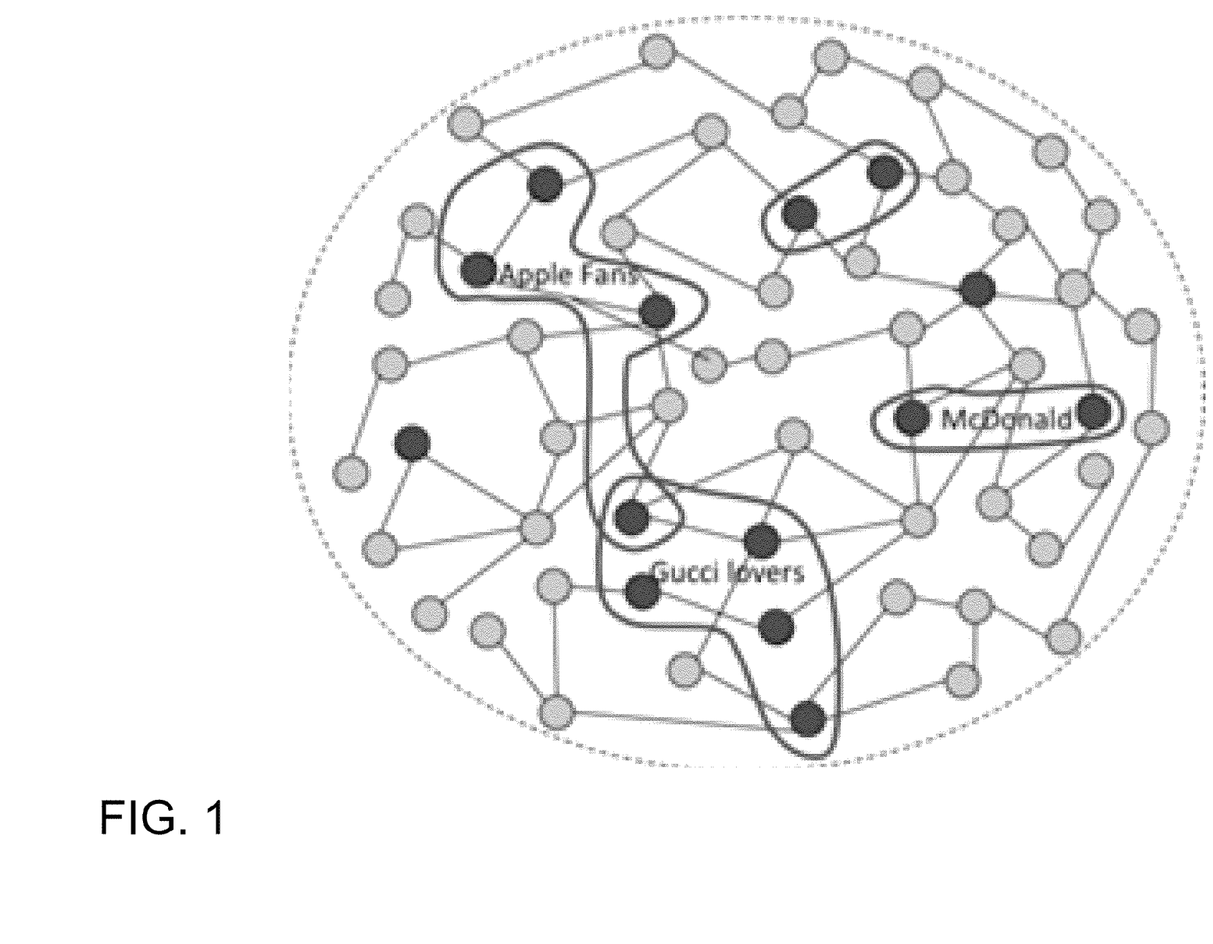
FIG. 1 illustrates group detection problems.
Figure 2:
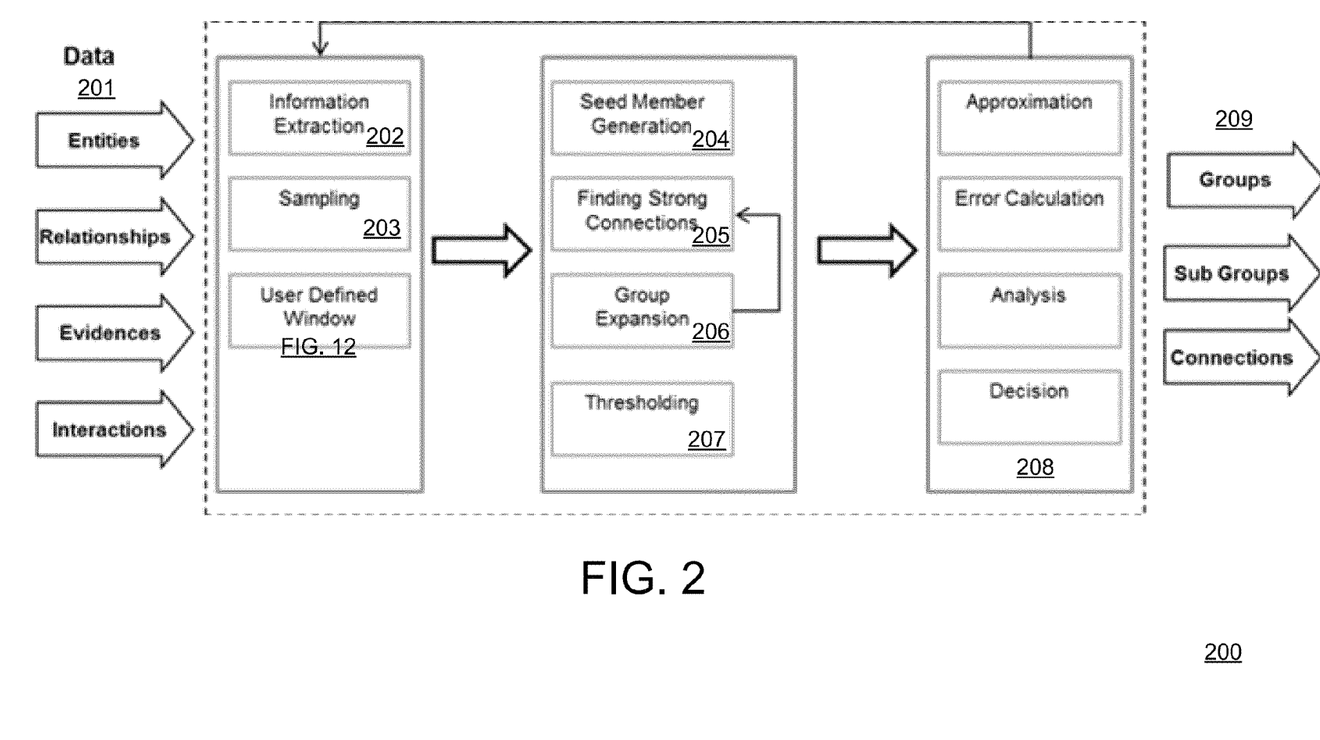
FIG. 2 illustrates a group finder architecture.

Referring now to the drawings, and FIG. 1 thereof, there is shown three main issues with group detection: (1) finding an individual with specific interest, (2) grouping those with the same interest, and (3) labeling each group. FIG. 2 shows the general architecture for provided group finder. This system is a hybrid logic-based/statistical link discovery component designed to solve group detection problems. It can answer the following questions: (1) How likely it is that person P is a member of group G? (2) How likely it is that persons P and Q are members of the same group? and (3) How likely it is that persons P and Q are strongly connected?

The system takes all types of evidence including hard evidence and prediction (e.g., stored in databases) as input and produces group hypotheses (e.g., lists of group members) as output. The system works in four phases. First, a group seed generator analyzes the primary evidence and outputs a set of seed groups. Second, an information-theoretic mutual information model finds likely new candidates for each group, producing an extended group. Third, the mutual information model is used to rank these likely members by how strongly connected they are to the seed members. Fourth, the ranked extended group is pruned using a threshold to produce the final output.

The system includes data 201, composed of a variety of choices: social data and profiles; geo-location data, social media about entities (e.g., people, groups etc.) and their attributes, relationships among them (e g , familial relationship), evidence regarding these entities (e.g., being at the same event at the same time) and interactions (e.g., phone call between two entities). Data comes in format of streams with a time stamp in a real-time basis.

Information extraction system 202 is composed of subsystems to extract information from structured data (e.g., database, embedded database, or a simple tab separated file), unstructured data (e.g., text, short messages, news), geo-location data (e.g., information about the position of a person), links between people, events, and other features, as well as subsystems for crawling, mapping brands to social media data, and mapping URLs and web sites to users.

Sampling methods and techniques 203 sample form data stream, including linear sampling or un-balanced sampling, and the like. Seed member generation 204 generates a suitable initial set of seed group hypotheses. In finding strong connections at 205, after exploiting the various explicit and implicit evidences, the system tries to identify additional members by looking for people that are strongly connected with one or more of the seed members. In group expansion 206, given that the system can use the mutual information calculation to find strongly connected individuals, the system can exploit this capability to expand the seed. In thresholding at 207, the result of the process described above provides a list of extended groups where members are ranked by their mutual information scores. In approximation, error calculation and decision at 208, using methods such as Hoeffding bound, the system approximates the sample and measures the possible error between the sampled version and non-sampled data to decide if the error is acceptable or not.

Figure 11:
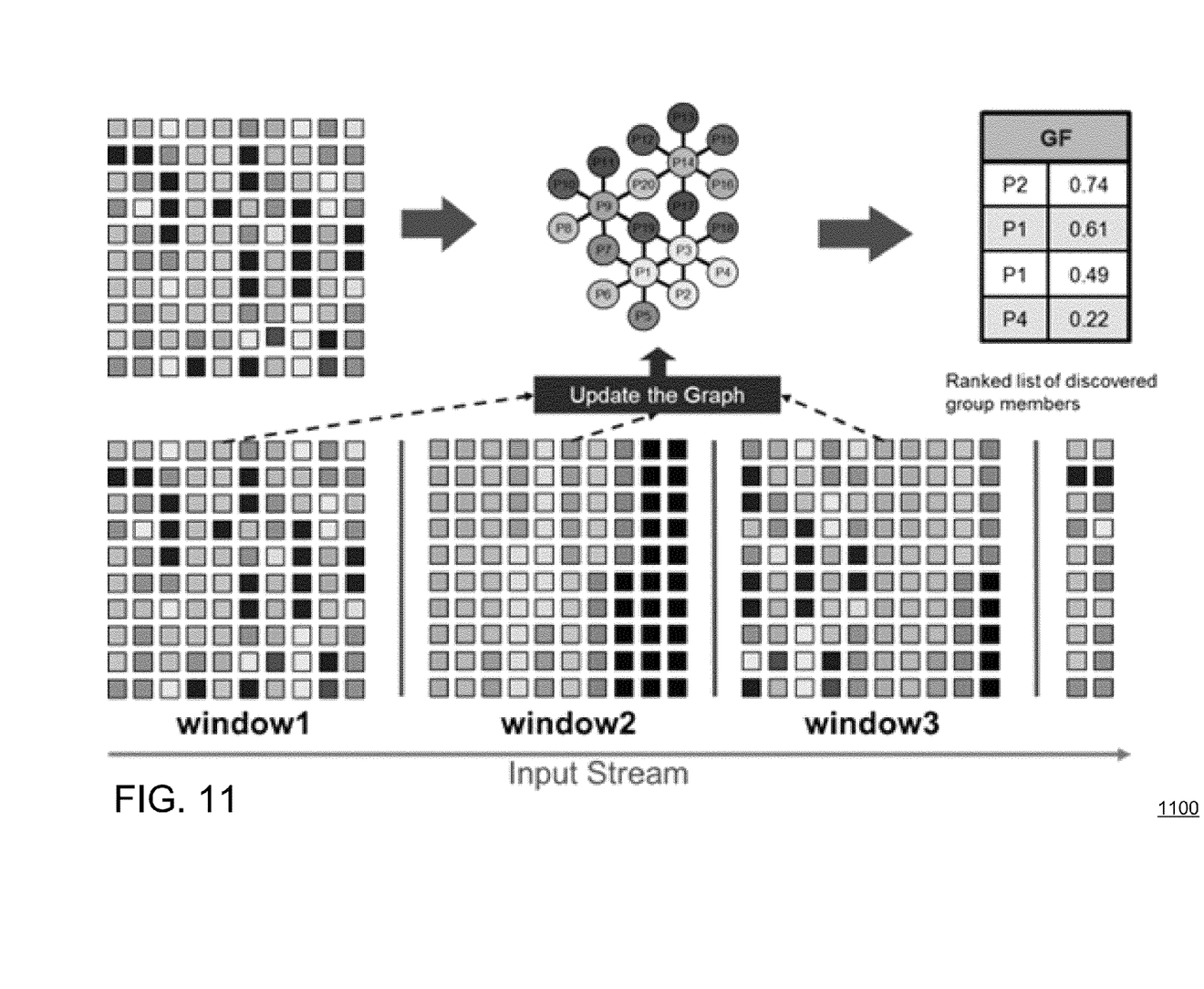
FIG. 11 illustrates a group finder update procedure.

The output of the system is a set of groups, sub groups and connections 209 among entities. The data system 201 feeds data into the information extraction system 202, which then feeds to the sampling system 203. The output of the sampling system 203 goes to the group detection process (e.g., seed member generation 204, finding strong connection at 205, group expansion 206, and thresholding 207), which passes the data to approximation module 208 to measure the error. This process can be repeat if necessary. The output of such a system can be in form of groups, sub-groups and strong connections among entities, as shown in FIGS. 2 and 11.

Figure 9:
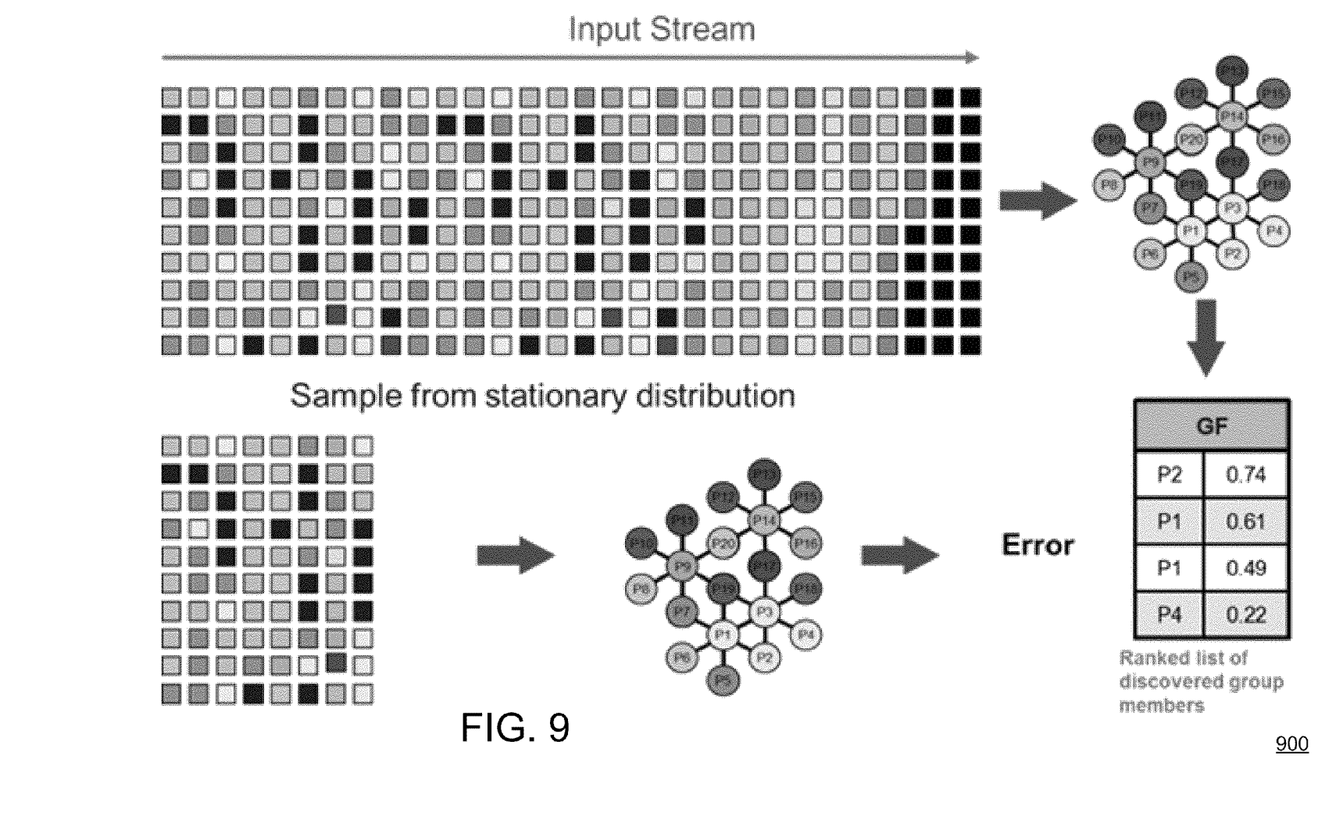
FIG. 9 illustrates a Hoeffding bound for a stationary data stream.
Figure 10:
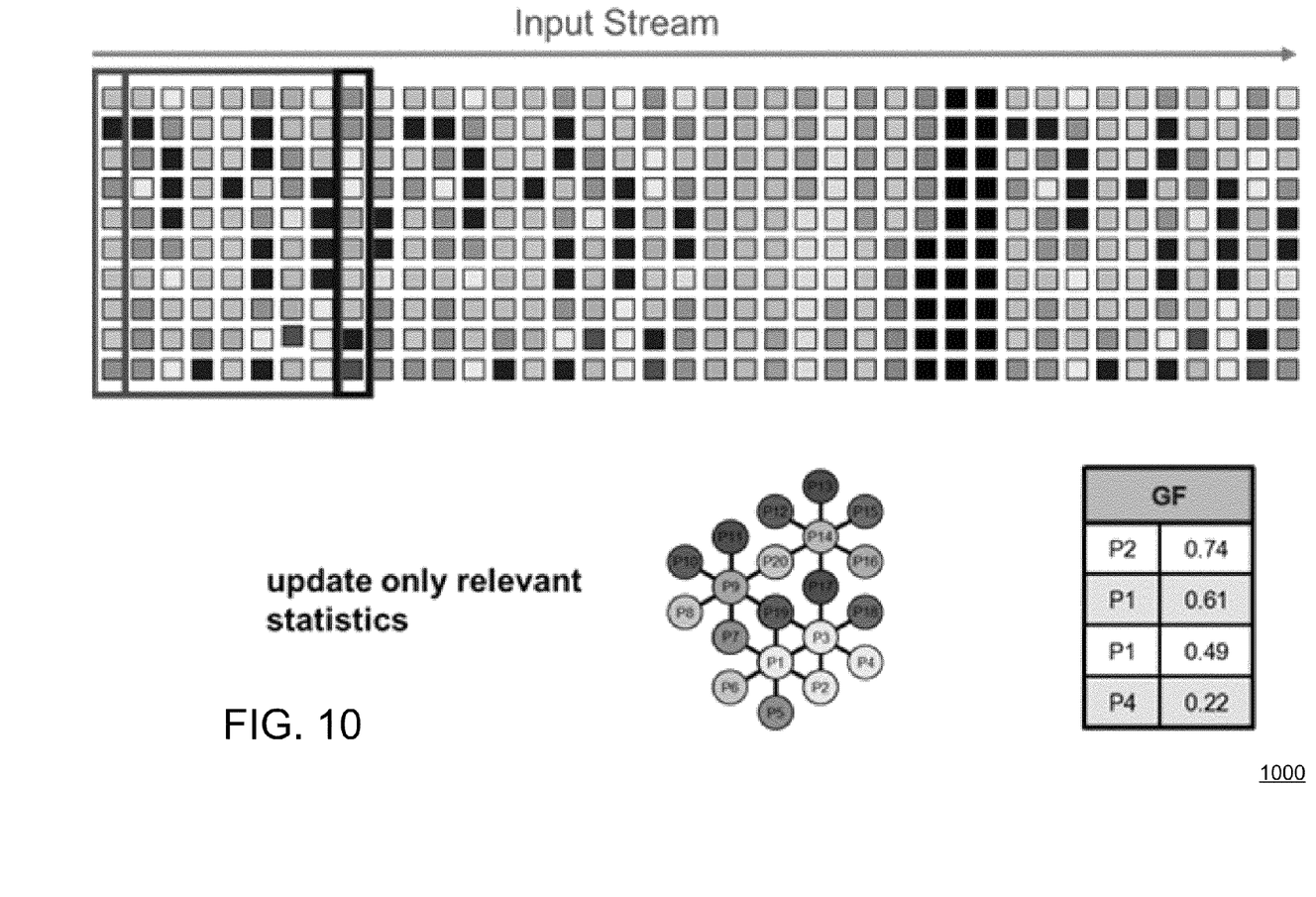
FIG. 10 illustrates a Hoeffding bound for a non- stationary data stream.

First we sample the data. For stationary data, the system only sample once, and for non-stationary data, the system samples frequently, as illustrated in FIGS. 9 and 10.

Next the system tries to generate a suitable initial set of seed group hypotheses. Each seed group is intended to be a suitable candidate for representing one of the actual groups in the evidence data, even though the number of seed members known or logically inferable for it might be significantly less than the group's actual members.

To generate good seed groups, the system employs a logic-based reasoning system that scrubs every piece of available membership information from evidence. The process of finding seeds is different for known and unknown groups. For known groups, the system starts with a simple query to retrieve existing groups and their explicitly declared members. The system then employs a number of logic rules to find highly likely additional group members that are only indirectly stated in the evidence. For example, world members with the same interest, participate in the same type of activities, go the same places, and like same kind of objects. A group refers to a set of entities (e.g., people, groups, companies, etc.) that share the same interest in a given object, or share the same behavior or opinion. To find additional members of a group, the system can look for exploitations performed by a group that have additional participants not explicitly known to be members of the group.

For unknown groups, the system use rules to look for patterns on events to find seeds. However, such teams may be subsets of one of the known groups or two or more of the teams may be part of the same unknown group. For this reason, it is advantageous to use merging techniques later to combine teams (or e.g., their extended groups) if appropriate.

After exploiting the various explicit and implicit evidences, the system tries to identify additional members by looking for people that are strongly connected with one or more of the seed members. To find two strongly connected entities, the system needs to aggregate many other known links between them, and statistically contrast those with connections to potential other entities or the general population. This typically cannot be done via a logic-based approach, and instead is achieved via an information-theoretic mutual information model.

The mutual information model can identify entities strongly connected to a given entity or a set of entities and provide a ranked list based on connection strength. To do this, the system exploits data, such as individuals sharing the same property (e.g., having the same address) or being involved in the same action (e.g., sending email to each other). Since an observer usually records such information, this can be referred to as evidence. Time is often also an important element of evidence, and is also recorded in the evidence database (EDB). Without loss of generality, the focus of this disclosure is on individuals' actions, but not on their properties.

The system transforms the problem space into a graph in which each node represents an entity (e.g., such as a person), and each link between two entities represents the set of actions (e.g., emails, phone calls etc.) they are involved. For each node, the system represents the set of its actions with a random variable, which can take values form the set of all possible actions.

To address this problem, the system measures the mutual information (MI) between the random variables representing individuals' activities. MI is a measure of the dependence between two variables. If the two variables are independent, the MI between them is zero. If the two are strongly dependent, for example, one is a function of another; the MI between them is large. The system therefore deduces that two individuals' mutual information is a good indicator as to whether or not they are in fact strongly connected to each other or compared to the rest of the population.

Given that the system can use the mutual information calculation to find strongly connected individuals, the system can exploit this capability to expand the seed. This expansion is done in the following steps:

(1) For each seed member in a seed group retrieve all. This step therefore expands the seed group graph by one level.

(2) Now, the system views the expanded group as the universe, and computes MI for each connected pair in the graph.

(3) Next, the system looks for individuals that either have high MI score with one of the seed members or with all seed members, when viewed as a single "super individual". Members whose score is below a certain (e.g., fairly lax) user-defined threshold are dropped from the list.

(4) In this step the MI engine repeats the whole procedure by expanding the expanded group from the previous step one more level, and recalculates MI for the new graph. For known groups, the system stop here, and passes the result to the final thresholding step.

(5) For unknown groups, the system usually has much smaller seed sets, and therefore repeat the previous step one more time to achieve appropriately sized group hypotheses.

The advantages of this invention include the approximation and sampling. Using suitable methods, such as Hoeffding bound (e.g., illustrated in FIGS. 5, 6 and 7), the system can approximate the sample, and measure the possible error between the sampled version and non-sampled data to decide if the error is acceptable or not. The output of the system is a set of groups, sub groups connections among entities, and the like.

Figure 3:
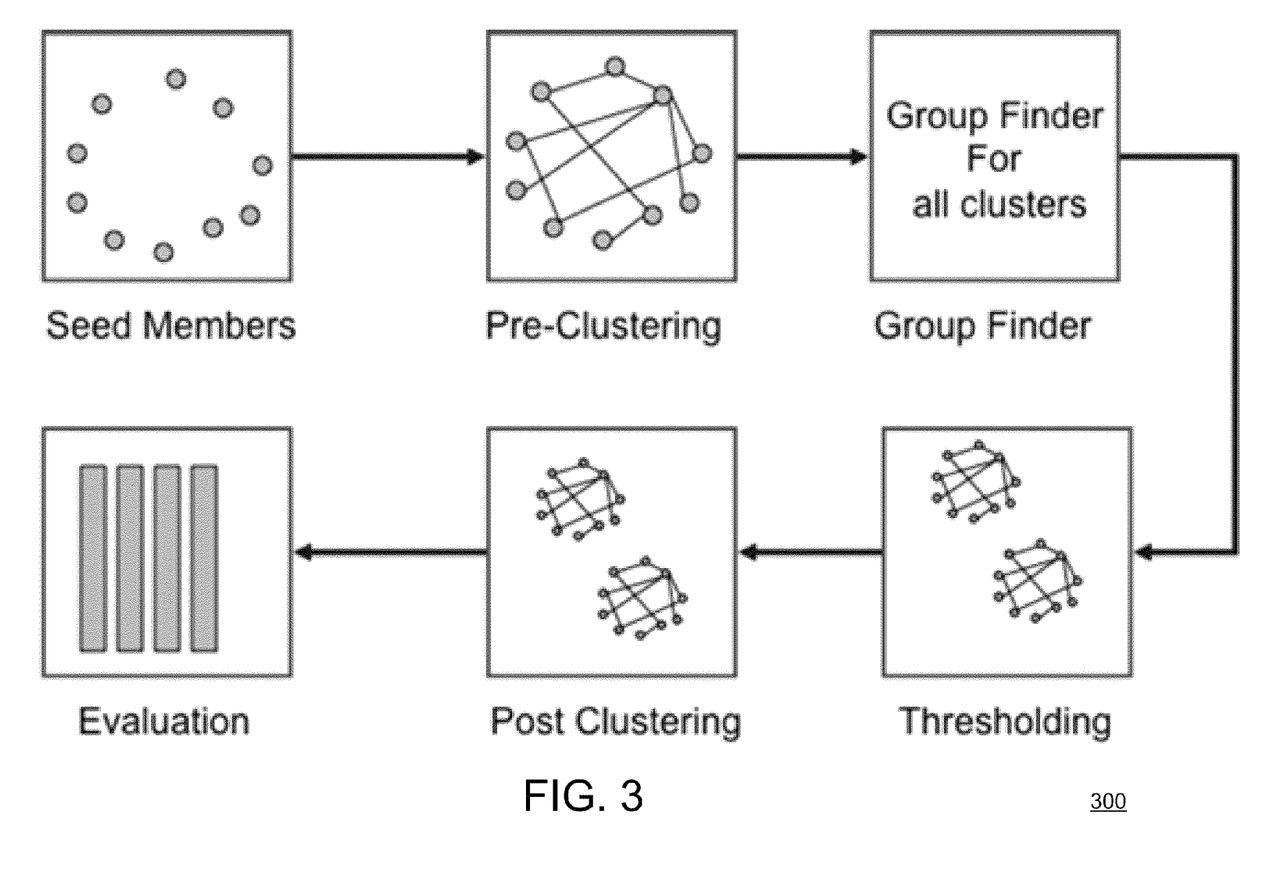
FIG. 3 illustrates finding of unknown groups.

In FIG. 3, the processing for known and unknown groups is somewhat different at the beginning and end of the process. First, the seed generation for unknown groups is different, since there is less information available. Second, the generation of unknown groups involves an extra step because the extended groups need to be clustered to eliminate duplicates before the thresholding step. For unknown groups, the system pre-clusters seed members, and uses the group finder to find the membership to all groups followed by thresholding and post clustering.

Figure 4:
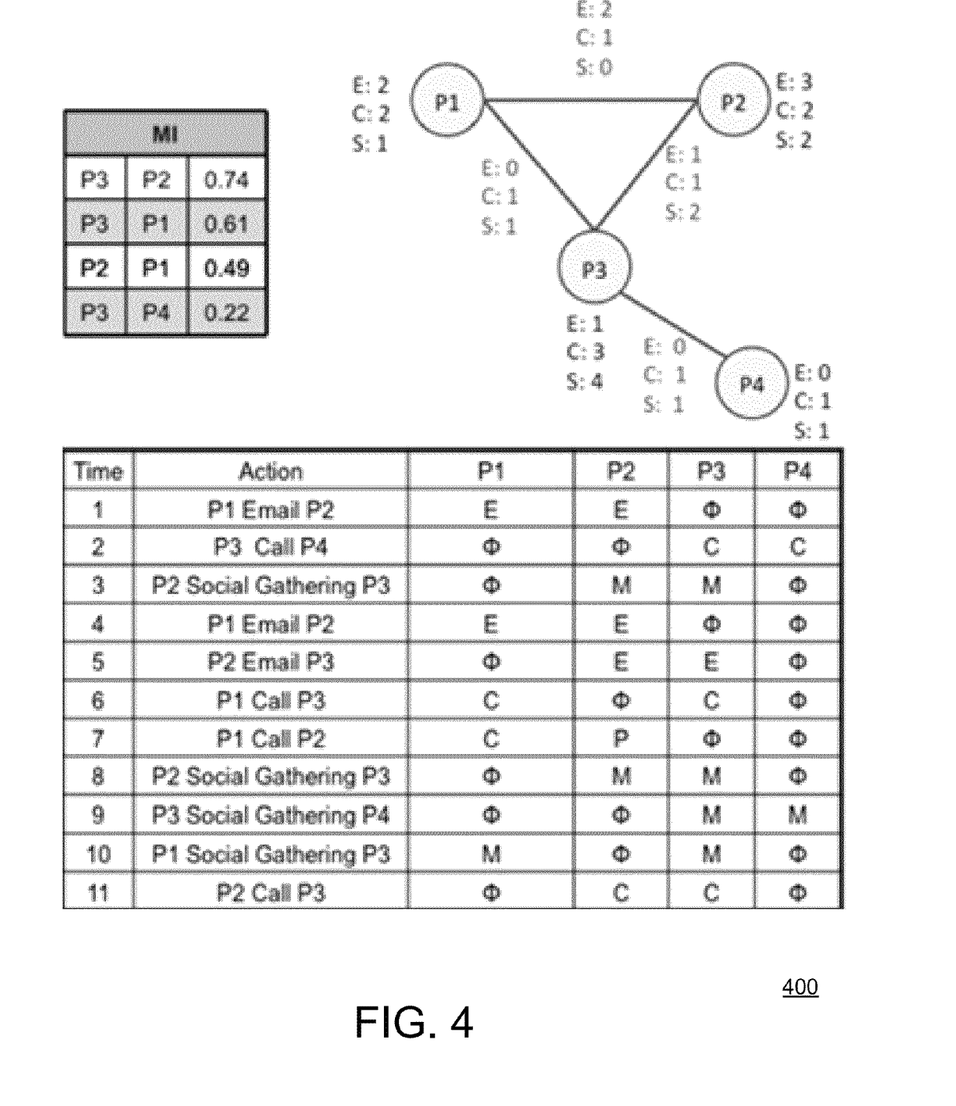
FIG. 4 illustrates a mutual information example.

FIG. 4 illustrates the math behind the model. P1, P2, P3 and P4 represent people. E, P and S stand for Email, Phone Call and Social Gathering respectively. The table at the bottom shows activities among individuals. The table on the left shows the calculated mutual information among individuals based on those activities. The mutual information is only one representative to measure the value of information. The system employs other potential modules, such as point wise mutual information or TF/IDF (Term Frequency/Inverse Person Frequency), and the like.

Figure 5:
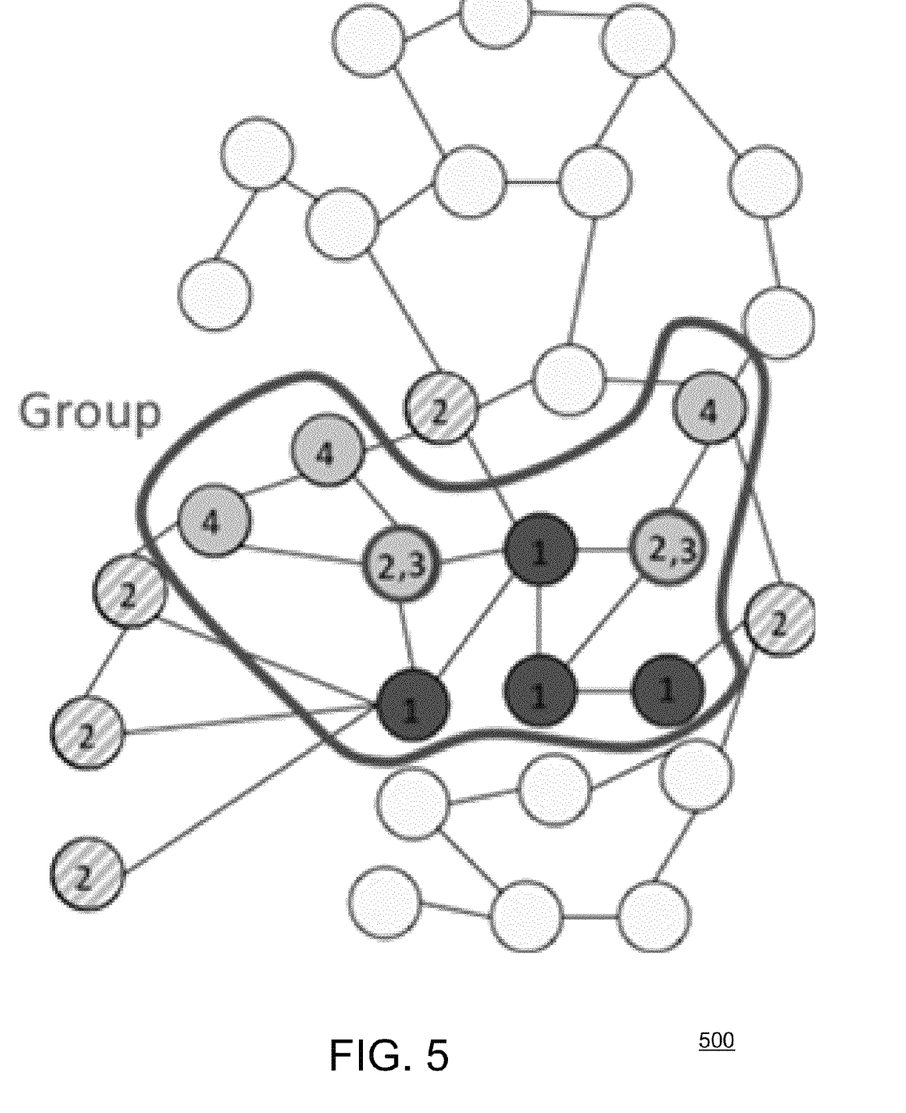
FIG. 5 illustrates a group extension strategy.

FIG. 5 is an illustration of the group extension strategy. This process starts from seed members. It then explores the graph around seeds. Finally, it finds nodes strongly connected to seeds using a suitable ranking function; and repeats the process until no more members can be added.

Figure 6:
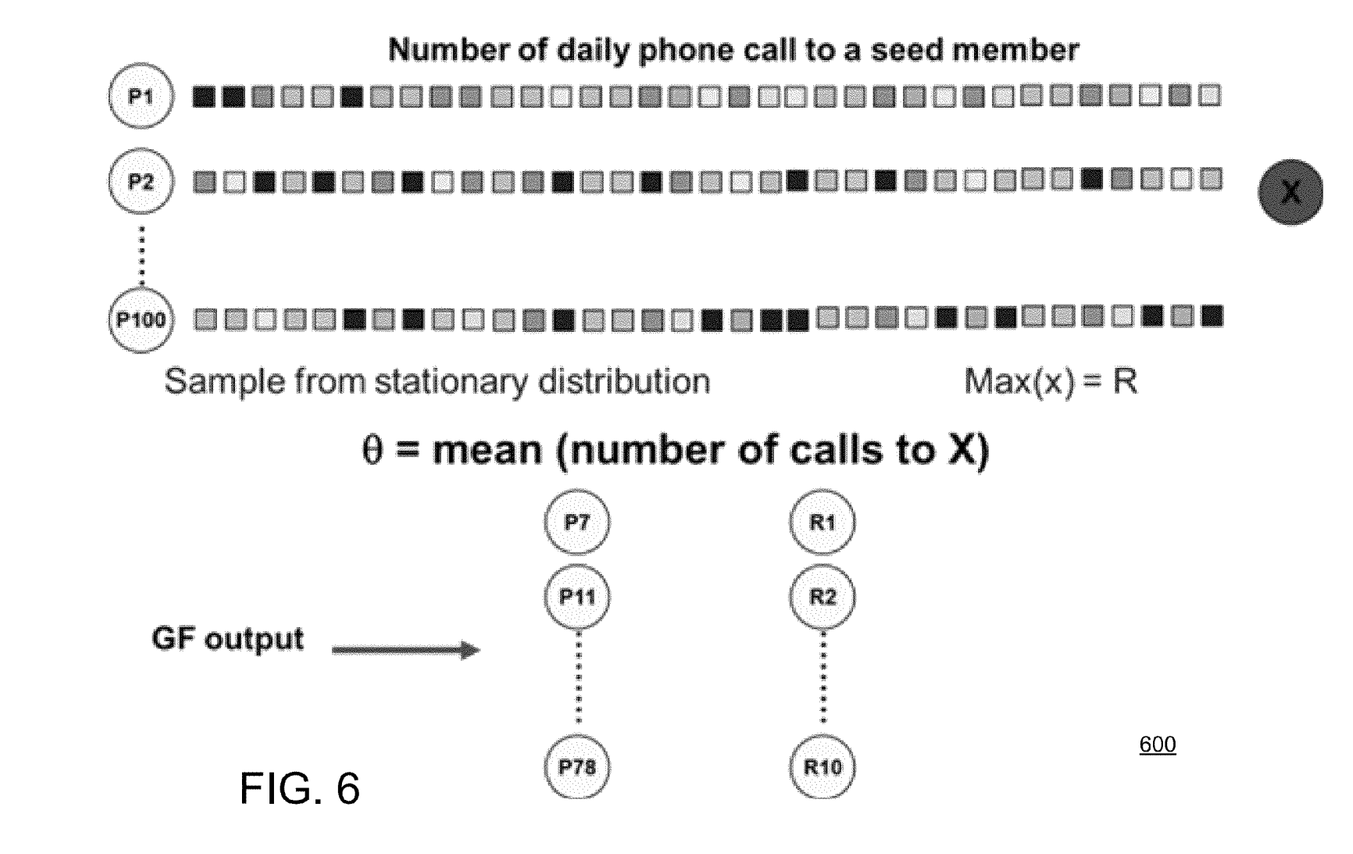
FIG. 6 illustrates an example of an interaction with an entity.

FIG. 6 is an illustration of the number of daily interaction to a seed member. In this example, the interaction is represented as a phone call, wherein GF stands for group finder, which ranks all suitable entities to find the new group members.

Figure 7:
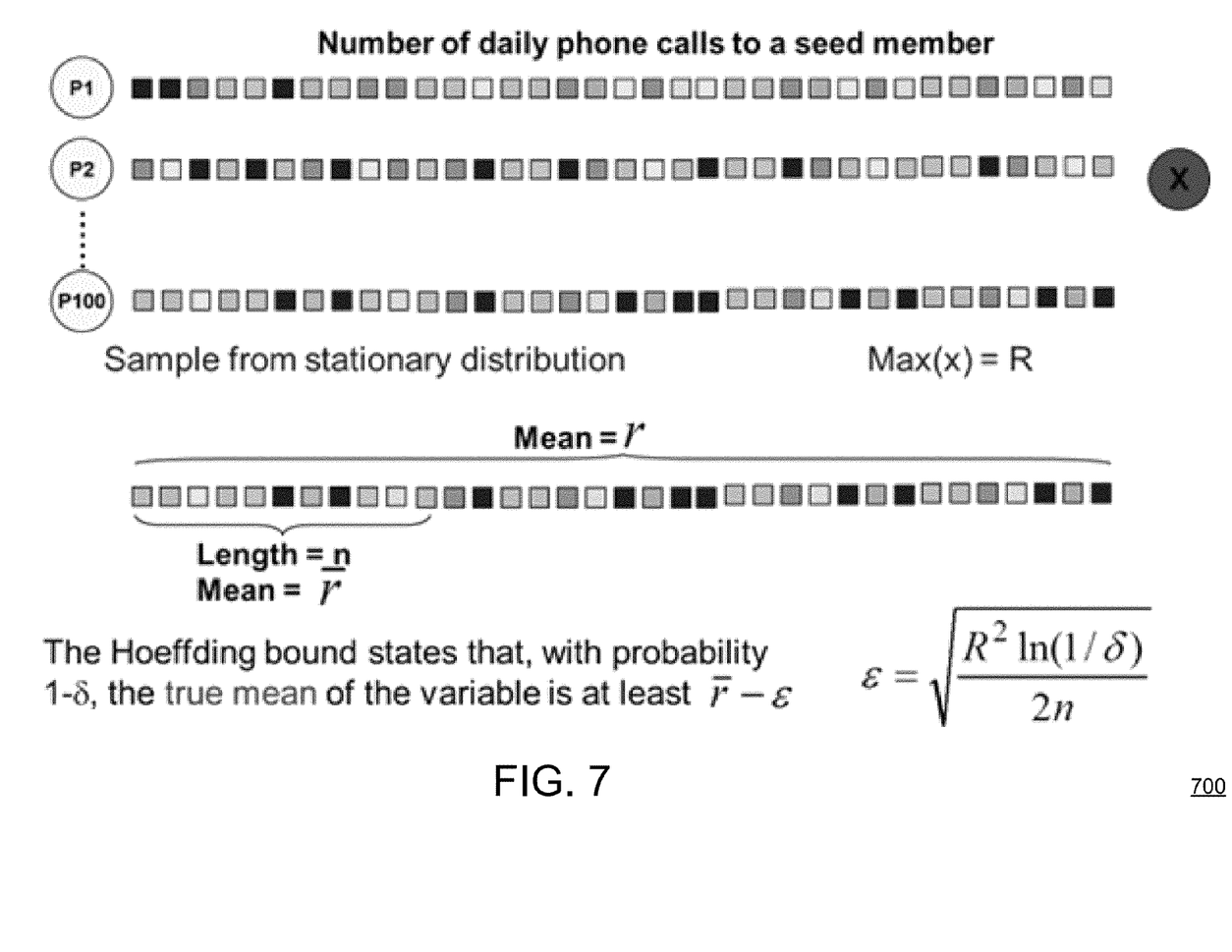
FIG. 7 illustrates a Hoeffding bound.

FIG. 7 is an illustration of a Hoeffding bound to measure the amount of error for a given sample of data. Generally speaking, since the system does not have access to all possible information about entities, the system needs to measure the potential error of operation over a sample.

Figure 8:
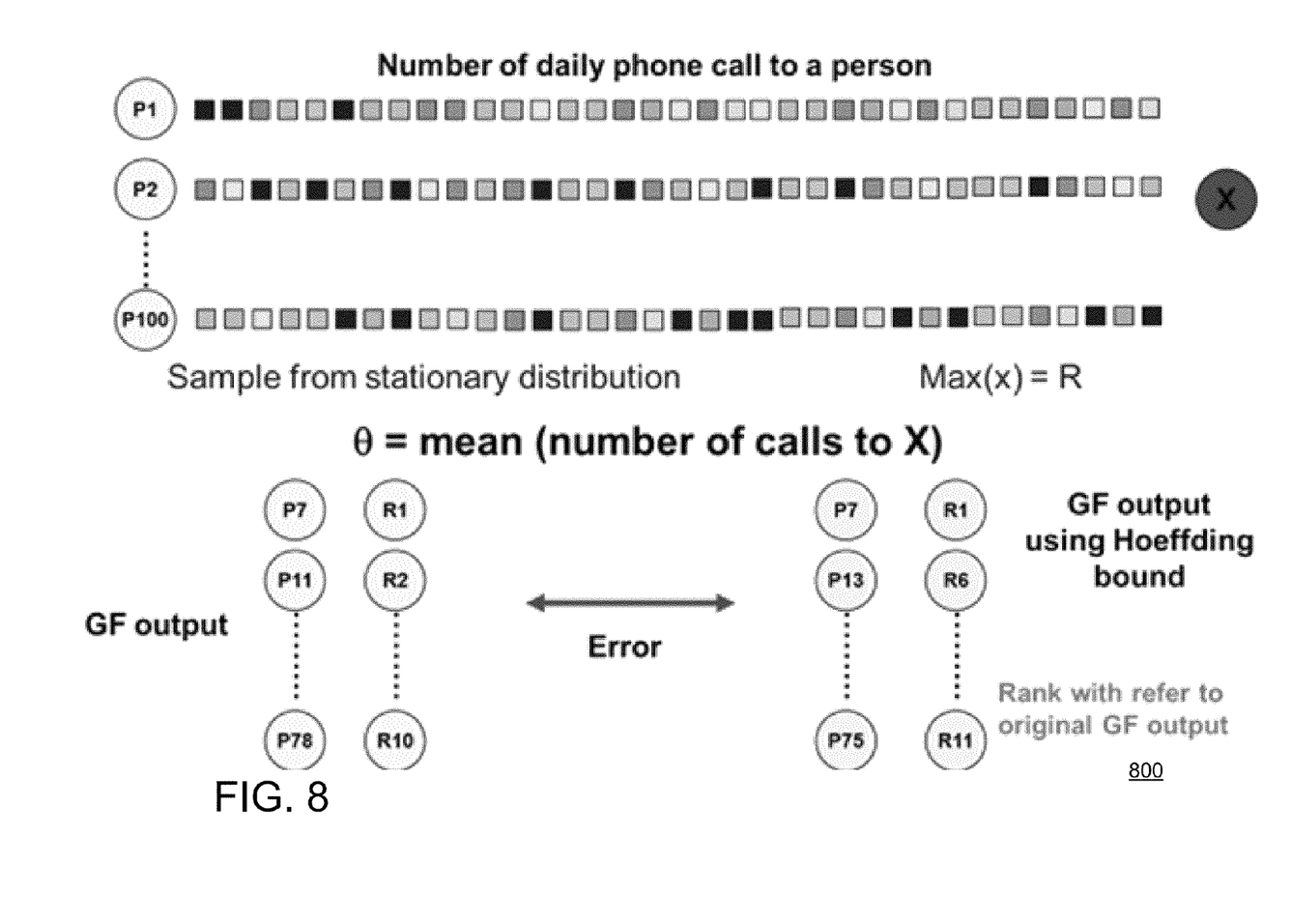
FIG. 8 illustrates application of a Hoeffding bound.

FIG. 8 is an illustration of applying a Hoeffding bound on the group finder. If the actual group is P7-P78, the system might get a different ranking (e.g., P7-P75), while knowing the distance to the original group.

FIG. 9 is an illustration of applying Hoeffding to a stationary data stream. FIG. 10 is an illustration of applying Hoeffding bound to a non-stationary data stream. In each window, only relevant statistics are updated accordingly.

Figure 12:
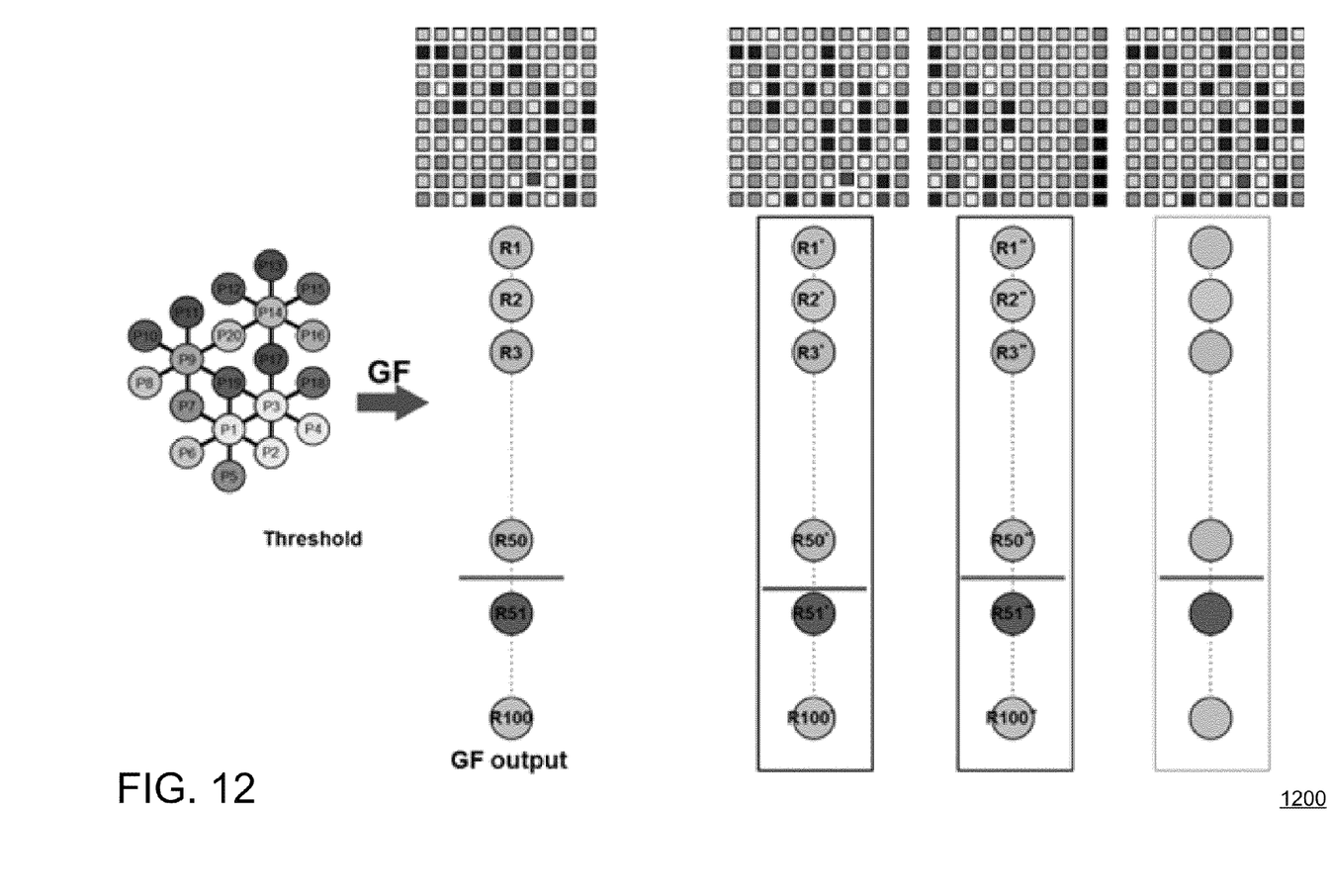
FIG. 12 illustrates user defined window sampling.

FIG. 11 is an illustration of a group finder update procedure, wherein each window graph can be updated, and a new group can be built accordingly. Such a procedure can be asynchronous, and need not to be real-time. FIG. 12 is an illustration of a user defined window for a group finder update, wherein a user can focus only on a subset of the data to study the emerged group.

The above-described devices and subsystems of the illustrative embodiments can include, for example, any suitable servers, workstations, PCs, laptop computers, PDAs, Internet appliances, handheld devices, cellular telephones, wireless devices, other electronic devices, and the like, capable of performing the processes of the illustrative embodiments.

The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (e.g., if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, flash memories, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A computer implemented system for identifying strong links and discovering hidden relationships among entities, the system comprising:

the system configured for identifying strong links and discovering hidden relationships among entities, wherein the entities include places, time slots, people, groups, and organizations; and the system configured for identifying the strong links and discovering the hidden relationships based on low-level data streams, and incomplete and noisy evidence data streams.

2. The system of claim 1, wherein the system is configured to combine knowledge representation and reasoning with approximation and randomization, text mining, machine learning, link discovery and statistical analysis to find a connection among seemingly unrelated entities from data streams.

3. The system of claim 1, wherein the system is configured to identify groups based on knowing a small number of group members by approximation and sampling based on algorithms including Hoeffding bound to reduce a potential error between sampled and non-sampled data to determine if an error is acceptable or not.

4. The system of claim 1, wherein the system is configured to expand a hybrid link discovery model from a static database to a multi-stream database.

5. A method for a computer implemented system for identifying strong links and discovering hidden relationships among entities, the method comprising:

identifying with the system strong links and discovering hidden relationships among entities, wherein the entities include places, time slots, people, groups, and organizations; and identifying the strong links and discovering the hidden relationships with the system based on low-level data streams, and incomplete and noisy evidence data streams.

6. The method of claim 5, further comprising combining with the system knowledge representation and reasoning with approximation and randomization, text mining, machine learning, link discovery and statistical analysis to find a connection among seemingly unrelated entities from data streams.

7. The method of claim 5, further comprising identifying with the system groups based on knowing a small number of group members by approximation and sampling based on algorithms including Hoeffding bound to reduce a potential error between sampled and non-sampled data to determine if an error is acceptable or not.

8. The method of claim 5, further comprising expanding with the system a hybrid link discovery model from a static database to a multi-stream database.

9. A computer program product for a computer implemented system for identifying strong links and discovering hidden relationships among entities, and including one or more computer readable instructions embedded on a non-transitory, tangible computer readable medium and configured to cause one or more computer processors to perform the steps of:

identifying with the system strong links and discovering hidden relationships among entities, wherein the entities include places, time slots, people, groups, and organizations; and identifying the strong links and discovering the hidden relationships with the system based on low-level data streams, and incomplete and noisy evidence data streams.

10. The computer program product of claim 9, further comprising combining with the system knowledge representation and reasoning with approximation and randomization, text mining, machine learning, link discovery and statistical analysis to find a connection among seemingly unrelated entities from data streams.

11. The computer program product of claim 9, further comprising identifying with the system groups based on knowing a small number of group members by approximation and sampling based on algorithms including Hoeffding bound to reduce a potential error between sampled and non-sampled data to determine if an error is acceptable or not.

12. The computer program product of claim 9, further comprising expanding with the system a hybrid link discovery model from a static database to a multi-stream database.

* * * * *